C. E. SANGWIN.
PRINTING PRESS ATTACHMENT.
APPLICATION FILED AUG. 2, 1915.

1,178,266.

Patented Apr. 4, 1916.
2 SHEETS—SHEET 1.

Witnesses:
H. S. Bull
B. G. Richards

Inventor,
Charles E. Sangwin,
by Joshua R. H. Potts
his Attorney.

C. E. SANGWIN.
PRINTING PRESS ATTACHMENT.
APPLICATION FILED AUG. 2, 1915.
1,178,266.
Patented Apr. 4, 1916.
2 SHEETS—SHEET 2.
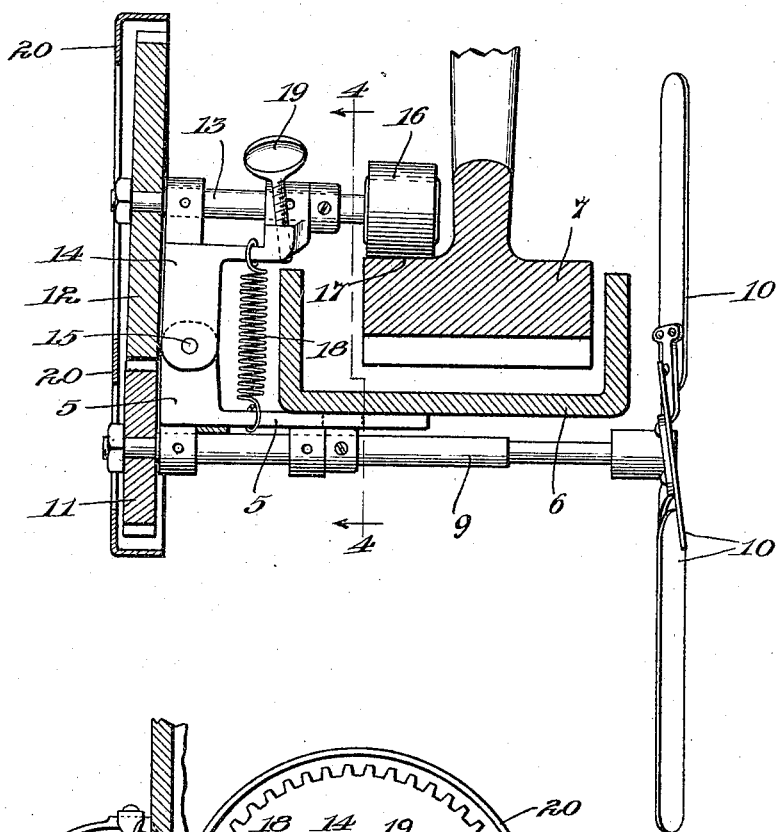
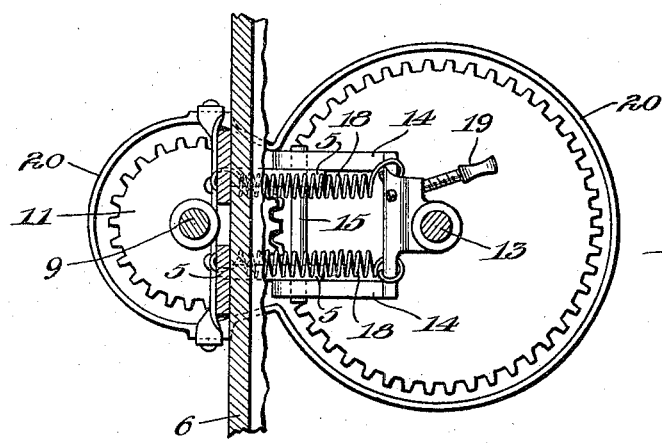
Witnesses:
H. S. Bull.
B. G. Richards
Inventor,
Charles E. Sangwin,
by Joshua R. H. Potts
his Attorney.

UNITED STATES PATENT OFFICE.

CHARLES E. SANGWIN, OF CHICAGO, ILLINOIS, ASSIGNOR OF ONE-HALF TO ROBERT B. BARTON, OF CHICAGO, ILLINOIS.

PRINTING-PRESS ATTACHMENT.

1,178,266.   Specification of Letters Patent.   Patented Apr. 4, 1916.

Application filed August 2, 1915. Serial No. 43,226.

*To all whom it may concern:*

Be it known that I, CHARLES E. SANGWIN, a citizen of the United States, and a resident of the city of Chicago, county of Cook, and State of Illinois, have invented certain new and useful Improvements in Printing-Press Attachments, of which the following is a specification.

My invention relates to improvements in attachments for printing presses, and has for its object the provision of an attachment of this character arranged to keep the ordinary distributing and form rollers of a printing press cool in hot weather to prevent undue softening of the same.

The invention consists in the combinations and arrangements of parts hereinafter described and claimed.

Figure 1:
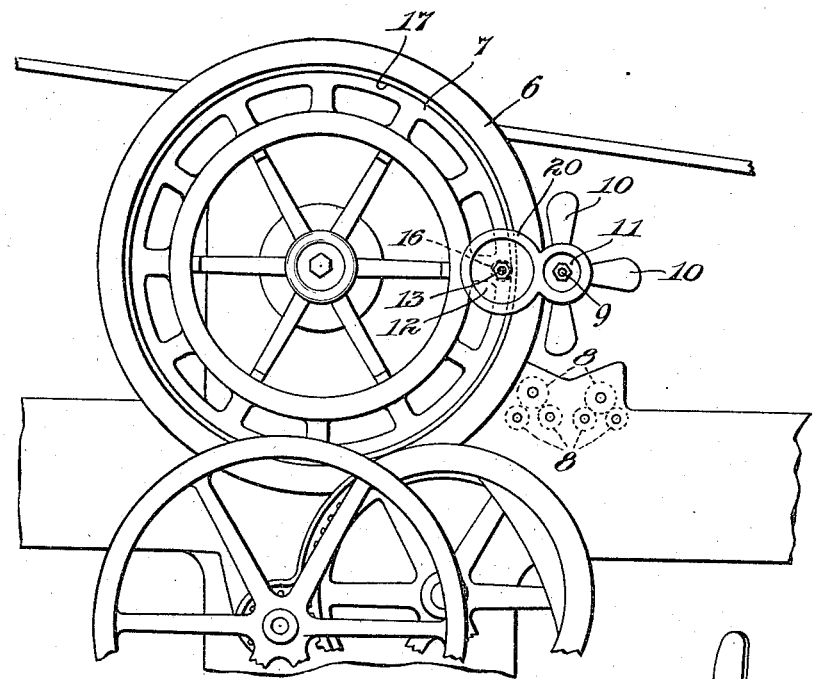
Figure 2:
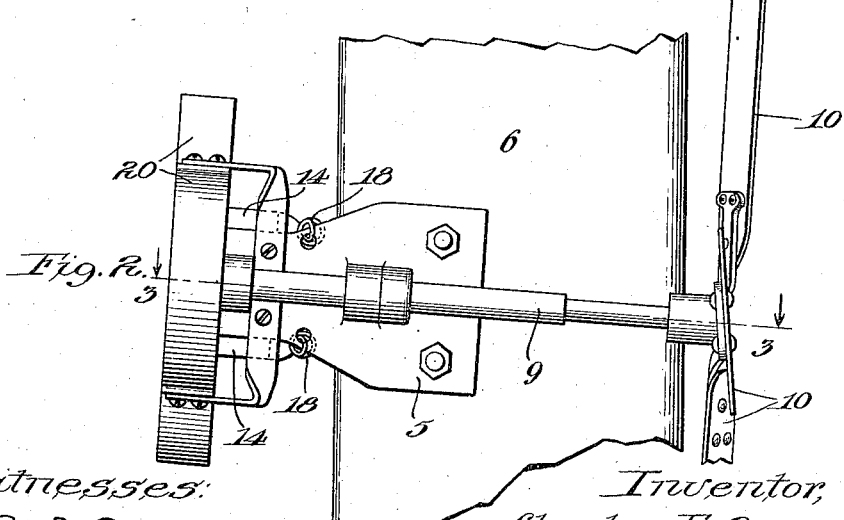

The invention will be best understood by reference to the accompanying drawings forming a part of this specification, and in which, Figure 1 is a side view of a portion of a printing press equipped with an attachment embodying my invention, Fig. 2, an end elevation of the same, Fig. 3, a section taken substantially on line 3—3 of Fig. 2, and Fig. 4, a section taken on line 4—4 of Fig. 3.

The preferred form of construction, as illustrated in the drawings, comprises an angular bracket 5 secured to the periphery of a gear housing 6 surrounding one of the usual gears 7 of the printing press, said bracket being positioned opposite and slightly above the ordinary distributing and form rollers 8 of the press. A fan shaft 9 is rotatably mounted on bracket 5 and carries a fan 10 arranged to direct a blast of air downwardly over the rollers 8. At its outer end, shaft 9 carries a pinion 11 meshing with a gear 12 mounted on a shaft 13 carried by a swinging bracket 14 pivoted at 15 to bracket 5. At its inner end, shaft 13 carries a friction roller 16 arranged to contact with an internal annular shoulder 17 formed on gear 7. Springs 18 are connected with brackets 14 and 5 in position to yieldingly hold friction roller 16 in contact with shoulder 17. A set screw 19 is arranged in bracket 14 in position to contact with the inner edge of housing 6 to force friction roller 16 out of contact with annular shoulder 17. A suitable housing 20 is mounted on bracket 5 in position to inclose and protect gears 11 and 12.

The arrangement is such that fan 10 will be normally operated to direct a blast of air downwardly over rollers 8 to keep the same cool in warm weather and thus prevent undue softening of the same. When it is desired to throw the fan out of commission, the set screw 19 is operated to press against the inner edge of housing 6, thus throwing friction roller 16 out of contact with shoulder 17 on gear 7. Gear 7 constantly rotates so that when friction roller 16 is in contact with surface 17, the fan 10 will be rotated. The movement of friction roller 16 is very slight in disconnecting from shoulder 17 so that the latitude of movement afforded by the teeth on gears 11 and 12 is sufficient to permit of the swinging of shaft 13 to accomplish this.

While I have illustrated and described the preferred form of construction for carrying my invention into effect, this is capable of variation and modification without departing from the spirit of the invention. I, therefore, do not wish to be limited to the precise details of construction set forth, but desire to avail myself of such variations and modifications as come within the scope of the appended claims.

Having described my invention what I claim as new and desire to secure by Letters Patent is:

1. In combination, a printing press having rollers; a gear for said press; a housing surrounding said gear; a bracket secured to said housing adjacent said rollers; a fan on said bracket arranged to direct a blast of air over said rollers; a second bracket adjustably connected with said first mentioned bracket; a shaft in said second mentioned bracket; a friction roller on said shaft contacting with said gear; an operative connection between said shaft and said fan; a spring arranged to press said friction roller against said gear; and a set screw on said second mentioned bracket arranged to contact with a stationary member and force said second mentioned bracket from contact with said gear, substantially as described.

2. In combination, a printing press having rollers; a gear for said press having an internal annular shoulder; a housing surrounding said gear; a bracket secured to said housing adjacent said rollers; a fan on said bracket arranged to direct a blast of air over said rollers; a second bracket adjustably connected with said first mentioned bracket; a shaft in said second bracket; a friction roller on said shaft contacting with said internal annular shoulder; and an operative connection between said shaft and said fan, substantially as described.

3. In combination, a printing press having rollers; a gear for said press having an internal annular shoulder; a housing surrounding said gear; a bracket secured to said housing adjacent said rollers; a fan on said bracket arranged to direct a blast of air over said rollers; a second bracket pivotally connected with said first mentioned bracket; a shaft in said second bracket; a friction roller on said shaft contacting with said internal annular shoulder; a spring arranged to press said friction roller against said shoulder; and gears connecting said shaft and fan, substantially as described.

4. In combination, a printing press having rollers; a gear for said press having an internal annular shoulder; a housing surrounding said gear; a bracket secured to said housing adjacent said rollers; a fan on said bracket arranged to direct a blast of air over said rollers; a second bracket pivotally connected with said first mentioned bracket; a shaft in said second bracket; a friction roller on said shaft contacting with said internal annular shoulder; a spring arranged to press said friction roller against said shoulder; gears connecting said shaft and fan; and a set screw on said second mentioned bracket arranged to contact with a stationary member and force said friction roller from contact with said shoulder, substantially as described.

In testimony whereof I have signed my name to this specification in the presence of two subscribing witnesses.

CHARLES E. SANGWIN.

Witnesses:
JOSHUA R. H. POTTS,
HELEN F. LILLIS.

Copies of this patent may be obtained for five cents each, by addressing the "Commissioner of Patents, Washington, D. C."